E. A. SUTCLIFFE.
Governors for Steam-Engines, &c.
No. 196,947. Patented Nov 6, 1877.
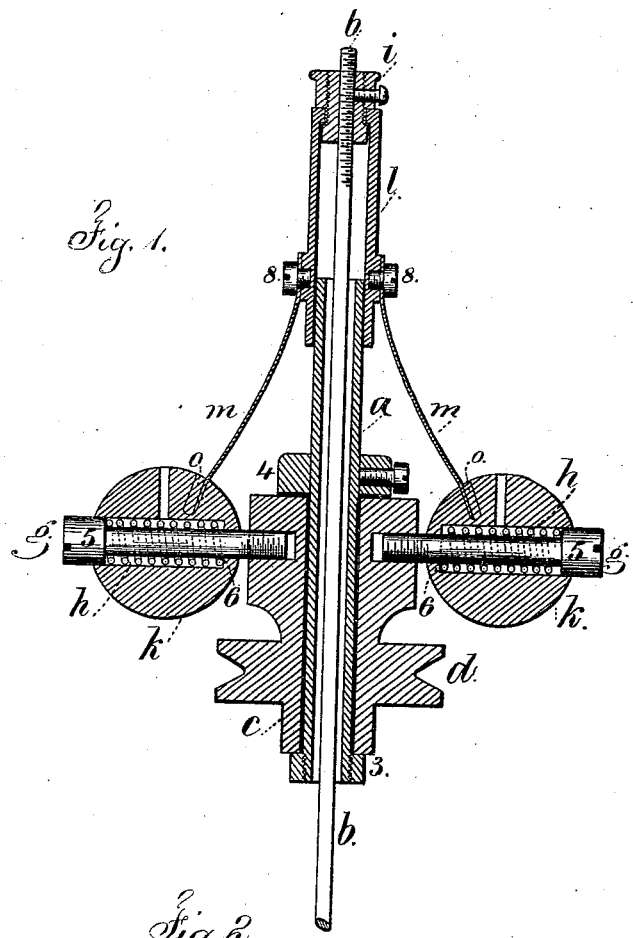
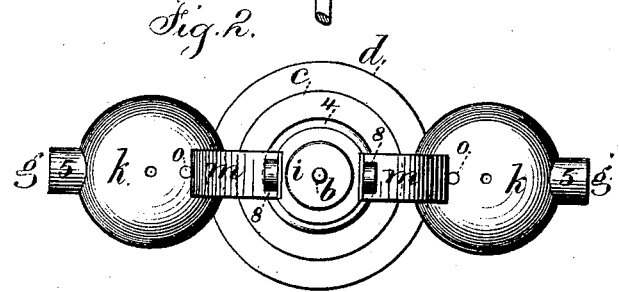

UNITED STATES PATENT OFFICE.

ELIHU A. SUTCLIFFE, OF NEW YORK, N. Y.

IMPROVEMENT IN GOVERNORS FOR STEAM-ENGINES, &c.

Specification forming part of Letters Patent No. 196,947, dated November 6, 1877; application filed December 4, 1876.

*To all whom it may concern:*

Be it known that I, ELIHU A. SUTCLIFFE, of the city and State of New York, have invented an Improvement in Governors, of which the following is a specification:

Upon a vertical spindle is a sleeve confined by collars, and carrying governor-balls. The sleeve is revolved, and the balls are projected more or less against the action of springs. The balls are connected with a vertically-sliding sleeve upon the spindle, and the rod that extends to the valve to be governed screws into a swivel-nut within the sleeve that is revolved by the governor, so that, while the sleeve revolves around the nut, the nut is not revolved, but it is moved endwise, in consequence of the end movement given to the sleeve by the governor-balls.

In the drawing, Figure 1 is a vertical section of the governor complete, and Fig. 2 is a plan view.

The spindle $a$ is stationary, and it is generally hollow, and supported by a frame, in the usual manner; but where the governor acts upon a lever this spindle may be solid. In the drawing the same is shown hollow for the passage of the rod $b$, that extends to the valve or regulator that is to be moved by the governor. Upon this spindle $a$ is the sleeve $c$, that is revolved by a belt to the pulley $d$, or by gearing, as usual.

The sleeve $c$ is confined between the two collars 3 and 4, but it is free to be revolved. The hub or enlarged central portion of this sleeve receives the inner ends of the radial arms $g$ $g$—there may be two or more—and around these are the helical springs $h$ and the weights $k$. It is necessary that the outer ends of these helical springs rest against shoulders 5 upon the arms $g$, and that the shoulders 6 upon the weights $k$ rest against the inner ends of the springs; and it is preferable to make the arms $g$ with screws at their inner ends to adjust the action of the springs upon the governor balls or weights.

The valve-rod $b$ is connected at its upper end adjustably, by the swivel-nut $i$, with the sliding sleeve $l$, and from this sleeve $l$ the springs $m$ extend to the weights or balls $k$. At the upper ends these springs $m$ are secured by screws 8 within slotted bearings in the sleeve $l$, and at the lower ends the springs enter saw cuts or incisions in the weights, which incisions run slightly diagonally to the holes for the pins $o$, in order that the said pins $o$, driven into the holes after the ends of the springs are in place, shall bend the springs into the pin-holes, and thereby prevent the ends of the springs being drawn out from the slots.

As the governor-balls $k$ are driven off by the centrifugal force, they compress the springs $h$ more or less, according to the speed, and in so doing act through the springs $m$ to move the sleeve $l$ endwise upon the rod $a$, and open or close the supply-valve more or less, according to the speed of the revolution imparted to the governor.

It will be apparent that the springs $m$ aid in resisting the centrifugal force of the balls, because such springs are bent into a compound curve as the balls are thrown off, and as the springs assume their normal position they lift the sleeve $c$. An increase of resistance to the balls as they are thrown off by the centrifugal force is important, as the force increases with the increase of distance the balls are from the axis of rotation, even at the same speed.

I claim as my invention—

The sleeve $c$, supported upon the stationary spindle $a$, and carrying the radial arms $g$ and governor-balls $k$, in combination with the springs $m$, sleeve $l$, swivel-nut $i$, and valve-rod $b$, substantially as and for the purposes set forth.

Signed by me this 10th day of November, A. D. 1876.

E. A. SUTCLIFFE.

Witnesses:
 GEO. T. PINCKNEY,
 HAROLD SERRELL.